United States Patent
Campbell et al.

(10) Patent No.: US 7,187,555 B2
(45) Date of Patent: Mar. 6, 2007

(54) CARD GUIDE FOR EXPANSION CIRCUIT CARD

(75) Inventors: Robert G. Campbell, Cupertino, CA (US); Raymond Chin, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 323 days.

(21) Appl. No.: 10/458,008

(22) Filed: Jun. 10, 2003

(65) Prior Publication Data

US 2004/0252469 A1 Dec. 16, 2004

(51) Int. Cl.
*H05K 5/00* (2006.01)

(52) U.S. Cl. .............. 361/756; 361/727; 361/686; 439/377; 439/61; 439/64

(58) Field of Classification Search ............. 361/760, 361/730, 756, 727, 741, 686, 801–802, 785, 361/788; 439/377, 368, 61, 64, 630; 211/41.17
See application file for complete search history.

(56) References Cited

U.S. PATENT DOCUMENTS

| | | | |
|---|---|---|---|
| 5,592,366 A * | 1/1997 | Goldman et al. ........... 361/796 |
| 5,892,662 A * | 4/1999 | Verma ......................... 361/796 |
| 6,038,138 A * | 3/2000 | Dayton et al. .............. 361/796 |
| 6,097,303 A * | 8/2000 | Lunz et al. ................. 340/825 |
| 6,097,605 A * | 8/2000 | Klatt et al. ................. 361/737 |
| 6,166,917 A * | 12/2000 | Anderson .................... 361/756 |
| 6,386,920 B1 * | 5/2002 | Sun ............................. 439/630 |
| 6,597,581 B2 * | 7/2003 | Barringer et al. ........... 361/756 |
| 6,646,890 B1 * | 11/2003 | Byers et al. ................. 361/802 |
| 6,738,259 B2 * | 5/2004 | Le et al. ..................... 361/737 |
| 6,746,280 B1 * | 6/2004 | Lu et al. ..................... 439/630 |
| 6,821,155 B2 * | 11/2004 | Hsieh ......................... 439/630 |
| 2003/0117768 A1 * | 6/2003 | Marcotte et al. ........... 361/600 |

* cited by examiner

*Primary Examiner*—Tuan Dinh
*Assistant Examiner*—Hung S. Bui (57) ABSTRACT

An apparatus in one example comprises a card guide that provides an installation path for an extension circuit card. The installation path promotes a coupled relationship between the extension circuit card and a circuit board. The card guide comprises a first connector and a second connector. To form the coupled relationship the extension circuit card attaches to one of the first connector and the second connector based on a configuration of the extension circuit card.

22 Claims, 5 Drawing Sheets

CARD GUIDE FOR EXPANSION CIRCUIT CARD

BACKGROUND

In one example, a computer system comprises a circuit board, such as a motherboard. The circuit board has a fixed area for holding electrical components used for data storage and processing. The fixed area of the circuit board may be increased through attachment of one or more expansion boards. The one or more expansion boards couple to the circuit board and provide additional area for holding additional electrical components. The circuit board comprises one or more locations that receive and interface with the one or more expansion boards. The one or more expansion boards comprise circuit boards supporting various additional hardware and/or software. For example, the one or more expansion boards attached to the circuit board may add memory or interfacing hardware to the computer system. The one or more expansion boards couple with the circuit board through electrical connectors on the one or more expansion boards and the circuit board.

Third generation input/output ("3G I/O") is an industry standard that defines the specifications of the one or more expansion boards and an interface between the one or more expansion boards and the circuit board. The third generation input/output industry standard comprises a replacement of the Peripheral Component Interconnect ("PCI") industry standard for computer system input/output. The third generation input/output industry standard defines a revolutionary ("REVO") expansion board format.

As one shortcoming, each of the one or more expansion boards are designed to be a same predetermined size. All of the electrical components of the one or more expansion boards are designed to fit within the same predetermined size of the one or more expansion boards. The circuit board is designed to accommodate the one or more expansion boards of the same predetermined size. A larger expansion board would provide a larger area for holding electrical components. However, the circuit board does not accommodate expansion boards designed to have a size different than the same predetermined size.

SUMMARY

The invention in one embodiment encompasses an apparatus. The apparatus includes a card guide that provides an installation path for an extension circuit card. The installation path promotes a coupled relationship between the extension circuit card and a circuit board. The card guide comprises a first connector and a second connector. To form the coupled relationship the extension circuit card attaches to one of the first connector and the second connector based on a configuration of the extension circuit card.

Another embodiment of the invention encompasses an apparatus. The apparatus includes means for accommodating any one of a plurality of different extension circuit cards in a card guide on a circuit board. The apparatus also includes means for electrically and mechanically coupling the one of the plurality of different extension circuit cards to one of a plurality of connectors of the circuit board based on a configuration of the one of the plurality of different extension circuit cards.

Yet another embodiment of the invention encompasses a method. Any one of a plurality of different extension circuit cards are accommodated in a card guide on a circuit board. The one of the plurality of different extension circuit cards is electrically and mechanically coupled to one of a plurality of connectors of the circuit board based on a configuration of the one of the plurality of different extension circuit cards.

DESCRIPTION OF THE DRAWINGS

Features of exemplary implementations of the invention will become apparent from the description, the claims, and the accompanying drawings in which:

DETAILED DESCRIPTION

Figure 1:
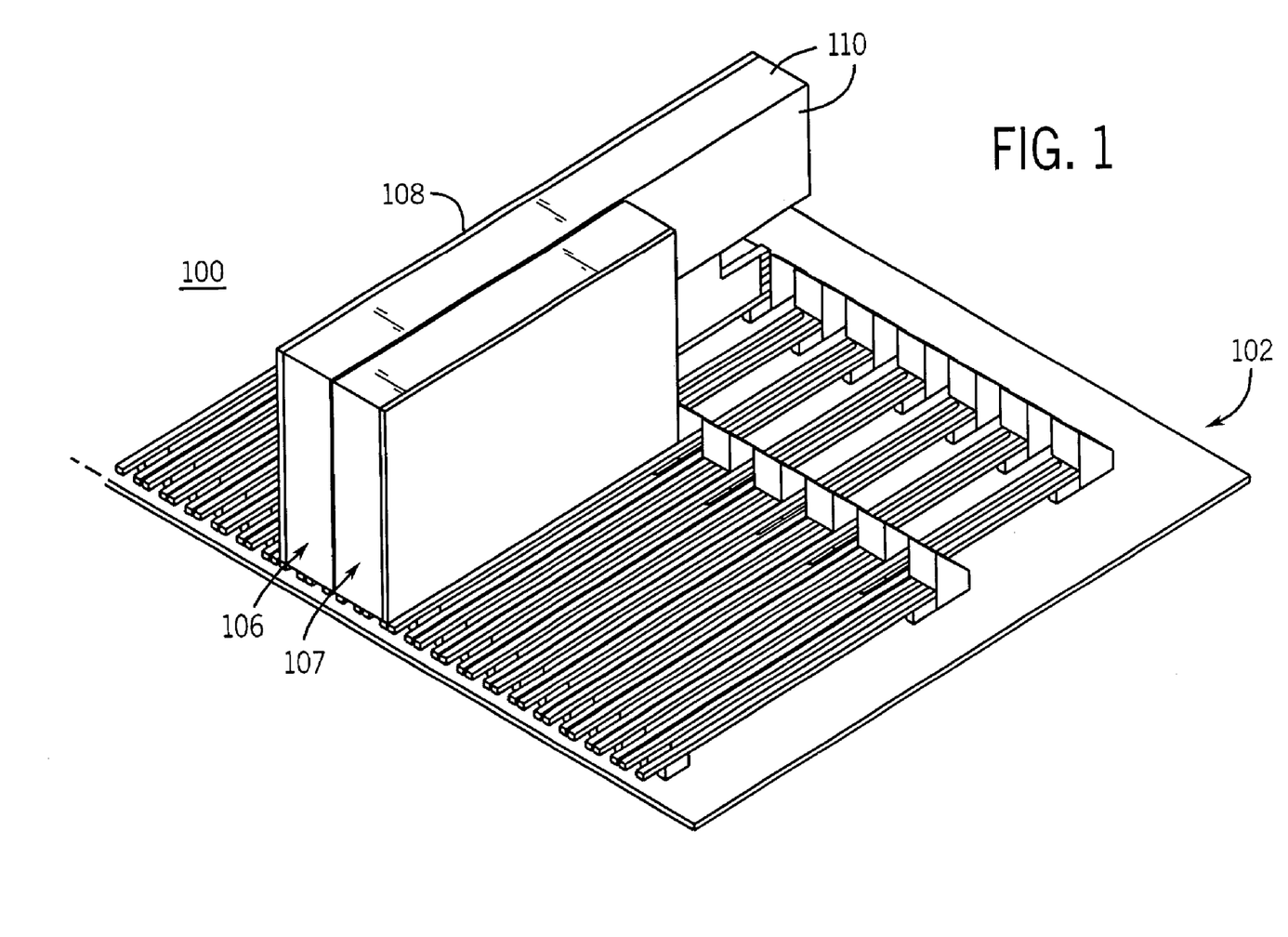
FIG. 1 is a representation of one exemplary implementation of an apparatus that comprises a circuit board coupled with a long expansion circuit board and a short expansion circuit board in a spaced, adjacent side-by-side relationship.

Turning to FIG. 1, a perspective view of an apparatus 100 illustrates a circuit board 102 coupled with a long expansion circuit board, long extension circuit card, or long expansion circuit card 106 and a short expansion circuit board short extension circuit card or short expansion circuit card 107 in a spaced, adjacent side-by-side relationship. The circuit board 102 may accommodate one or more additional long expansion circuit boards analogous to the long expansion circuit board 106 and one or more additional short expansion circuit boards analogous to the short expansion circuit board 107. A size of the long expansion circuit board 106 distinguishes the long expansion circuit board 106 from the short expansion circuit board 107. For example, the size of the long expansion circuit board 106 is greater than a size of the short expansion circuit board 107.

The long expansion circuit board 106 comprises a circuit board 108 of a pre-selected length and an enclosure 110. The enclosure 110 comprises a protective cover for the circuit board 108. The enclosure 110 comprises an optional accessory to the long expansion circuit board 106. The circuit board 102 accommodates a predetermined number of the long expansion circuit boards 106 and the short expansion circuit boards 107. In one example, the circuit board 102 comprises a motherboard. The long expansion circuit board 106 and the short expansion circuit board 107 conform to a third generation input/output ("3G I/O") industry standard. The third generation input/output industry standard comprises a replacement of the use of Peripheral Component Interconnect ("PCI") for computer system input/output.

Figure 2:
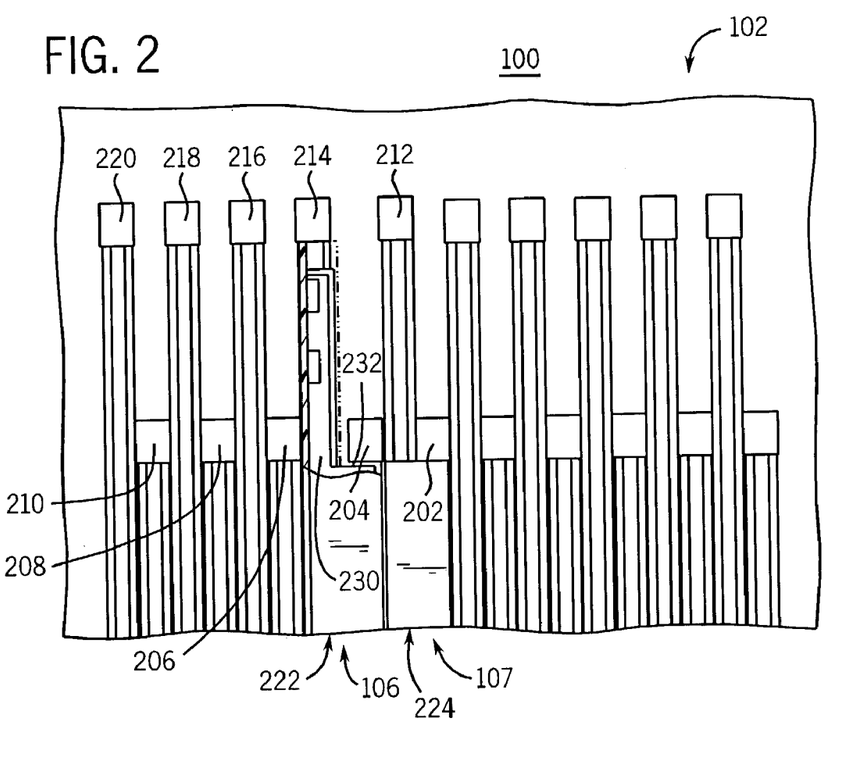
FIG. 2 represents a top view of the apparatus of FIG. 1.

Turning to FIG. 2, a top view of the perspective view of FIG. 1 illustrates an exemplary implementation of the apparatus 100 comprising the circuit board 102, the long expansion circuit board 106, the short expansion circuit board 107, a plurality of connectors 202, 204, 206, 208, 210, 212, 214, 216, 218, and 220, and a plurality of card guides 222 and 224. The plurality of card guides 222 and 224 comprise revolutionary input/output card format ("REVO") slots. The revolutionary input/output card format slots may accommodate either of the long expansion circuit board 106 or the short expansion circuit board 107. The card guides 222 and 224 provide installation paths for the long expansion circuit board 106 and the short expansion circuit board 107. During installation, the long expansion circuit board 106 and the short expansion circuit board 107 slide along the respective card guides 222 and 224 to engage with the respective connectors 214 and 202. The installation path of the card guide 222 promotes a coupled relationship between the long expansion circuit board 106 and the circuit board 102 though the connector 214. The installation path of the card guide 224 promotes a coupled relationship between the short expansion circuit board 107 and the circuit board 102 though the connector 202.

The card guides 222 and 224 accommodate any one of the long expansion circuit board 106 and the short expansion circuit board 107 in accordance with the third generation input/output industry standard. The plurality of connectors 202, 204, 206, 208, 210, 212, 214, 216, 218, and 220 are arranged as components of either a front row of connectors or a back row of connectors. For example, the front row of connectors comprise the plurality of connectors 202, 204, 206, 208, and 210 and the back row of connectors comprise the plurality of connectors 212, 214, 216, 218, and 220. The back row of connectors comprise a spaced and offset relationship with respect to the front row of connectors. The front row of connectors serve to couple with the short expansion circuit board 107. The back row of connectors serve to couple with the long expansion circuit board 106. The long expansion circuit board 106 and the short expansion circuit board 107 comprise a configuration that determines whether to attach to a connector of the front row of connectors or a connector of the back row of connectors. For example, the long expansion circuit board 106 comprises the configuration that allows attachment to the connector 214. The short expansion circuit board 107 comprises the configuration that allows attachment to the connector 202.

The long expansion circuit board 106 and the short expansion circuit board 107 may engage with any one of the plurality of card guides 222 and 224 or additional card guides analogous to the plurality of card guides 222 and 224. Along the card guide 222, a portion of the long expansion circuit board 106 extents past the front row of connectors to engage with the back row of connectors. Alternatively along the card guide 222, a portion of the short expansion circuit board 107 engages with the front row of connectors. The long expansion circuit board 106 and the short expansion circuit board 107 may engage with either a connector in the front row of connectors or a connector in the back row of connectors in the card guide 222. For example, the long expansion circuit board 106 may engage with the connector in the back row of connectors on a first side 230 of the card guide 222 and the short expansion circuit board 107 may engage with the connector in the front row of connectors on a second side 232 of the card guide 222.

The plurality of connectors 202, 204, 206, 208, 210, 212, 214, 216, 218, and 220 in one example comprise pedestal type connectors. The plurality of connectors 202, 204, 206, 208, 210, 212, 214, 216, 218, and 220 in another example comprise upright, right-angle header connectors. Those skilled in the art will appreciate the meaning of the term pedestal type connector. The term pedestal type connector is used in examples herein and those skilled in the art will be able to select the pedestal type connector that will satisfy the requirements of the pedestal type connector as described herein.

The plurality of card guides 222 and 224 serve to align the long expansion circuit board 106 and the short expansion circuit board 107 on the circuit board 102. In one example, the card guide 222 serves to align the long expansion circuit board 106 and the card guide 224 serves to align the short expansion circuit board 107. The card guide 222 serves to align the long expansion circuit board 106 to mechanically and electrically couple the long expansion circuit board 108 with the connector 214. The card guide 224 serves to align the short expansion circuit board 107 to mechanically and electrically couple the short expansion circuit board 107 with the connector 202. In another example, the card guide 222 serves to align the short expansion circuit board 107 and the card guide 224 serves to align the long expansion circuit board 106.

The circuit board 102 comprises one or more electrical components, for example, one or more electrical connections between the plurality of connectors 202, 204, 206, 208, 210, 212, 214, 216, 218, and 220, and processing components. The electrical components may comprise transistors, integrated circuits, resistors, and/or capacitors. In one example, the circuit board 102 comprises a printed circuit board ("PCB").

Figures 3, 4, 5:
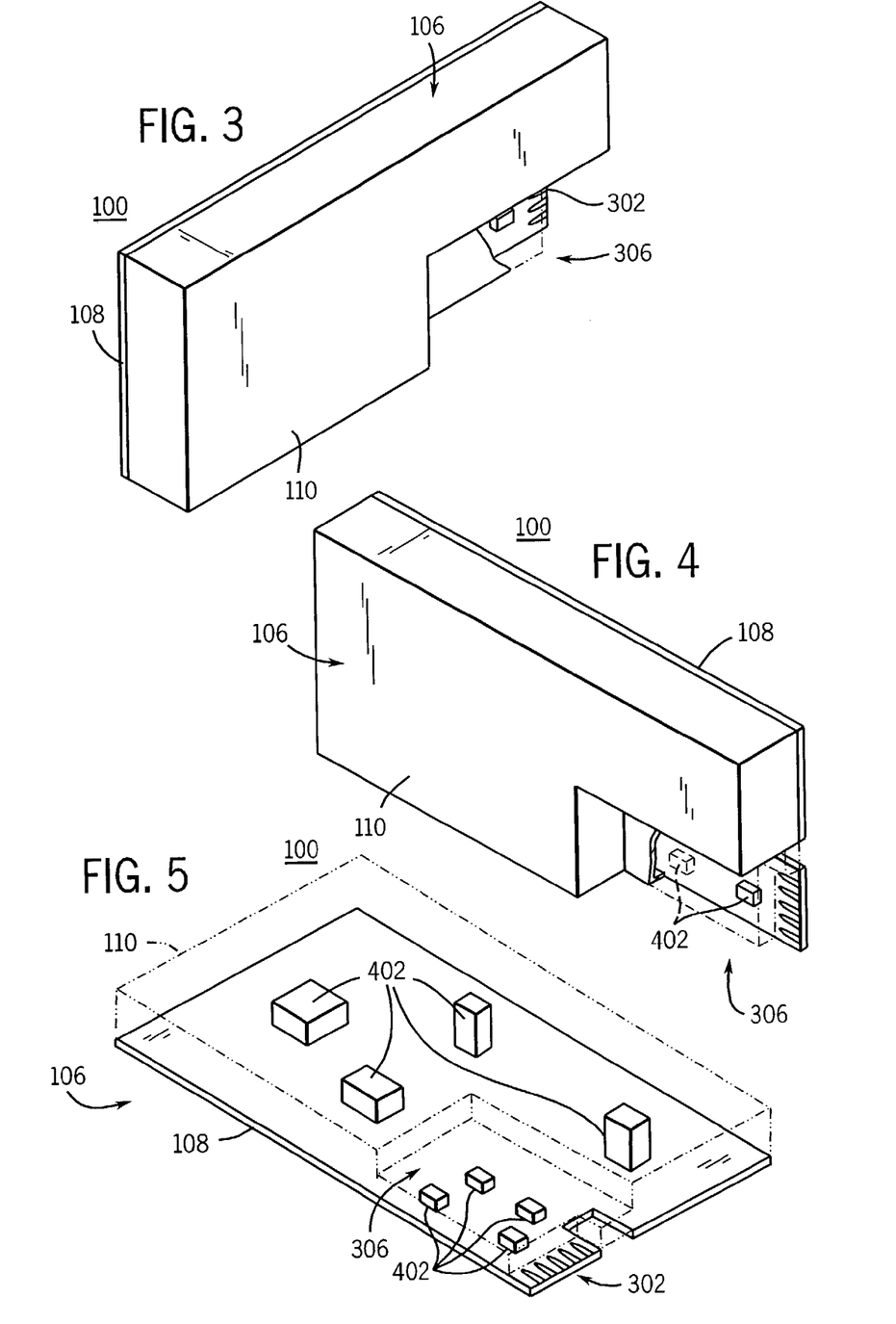
FIG. 3 is a representation of one exemplary implementation of the long expansion circuit board of the apparatus of FIG. 1.
FIG. 4 is another representation of one exemplary implementation of the long expansion circuit board of the apparatus of FIG. 1.
FIG. 5 is yet another representation of one exemplary implementation of the long expansion circuit board of the apparatus of FIG. 1.

Referring to FIGS. 2–3, another perspective view of the apparatus 100 illustrates an exemplary implementation of the long expansion circuit board 106. The long expansion circuit board 106 comprises a plug-in card. For example, the long expansion circuit board 106 comprises one or more of additional computer memory, input/output functionality, and additional processing power. The long expansion circuit board 106 mechanically and electrically couples to the connector 214. For example, the long expansion circuit board 106 comprises a connector 302 that mates with the connector 214 to form a mechanical and electrical connection. In one example, the connector 302 comprises a third generation input/output industry standard connector.

The enclosure 110 extends around a perimeter of the circuit board 108 to form the long expansion circuit board 106. The enclosure 110 comprises a recess 306 to expose the connector 302 and to provide clearance for the connector 302 to couple with connector 214. The recess 306 provides clearance to the connector 204 or any other of the plurality of connectors 202, 206, 208, and 210. The enclosure 110 serves to protect the circuit board 108 from environmental contamination such as stray electromagnetic radiation, dust, and debris. In one example, the enclosure 110 comprises a plastic enclosure for preventing dust contamination. In another example, the enclosure 110 comprises a metal enclosure to provide shielding from stray electromagnetic radiation.

Turning to FIG. 4, yet another perspective view of the apparatus 100 illustrates an exemplary implementation of the long expansion circuit board 106. The circuit board 108 comprises one or more electrical components 402. In one example, the circuit board 108 comprises a printed circuit board. The one or more electrical components 402 may comprise computer microprocessors, transistors, integrated circuits, resistors, and/or capacitors. The electrical components 402 are electrically and mechanically coupled or connected with the circuit board 108.

Referring to FIGS. 2 and 5, yet another perspective view of the apparatus 100 illustrates an exemplary implementation of the long expansion circuit board 106 with the enclosure 110 shown in phantom. A first portion of the circuit board 108 comprises a first portion of the one or more electrical components 402. The first portion of the one or more electrical components 402 comprise a first limited height with respect to the circuit board 108 to promote an accommodation of connection of the connector 302 to any one of the plurality of connectors 212, 214, 216, 218, and 220. The first limited height also accommodates clearance of the recess 306 in the enclosure 110. A second portion of the circuit board 108 comprises a second portion of the one or more electrical components 402. The second portion of the one or more electrical components 402 comprise a second limited height with respect to the circuit board 108 to promote allowance of connection of the enclosure 110 with the circuit board 108. The circuit board 108 may extend above and beyond the connectors 212, 214, 216, 218, and 220 to provide additional area on the circuit board 108 for additional electrical components, such as, one or more of the one or more electrical components 402.

Figure 6:
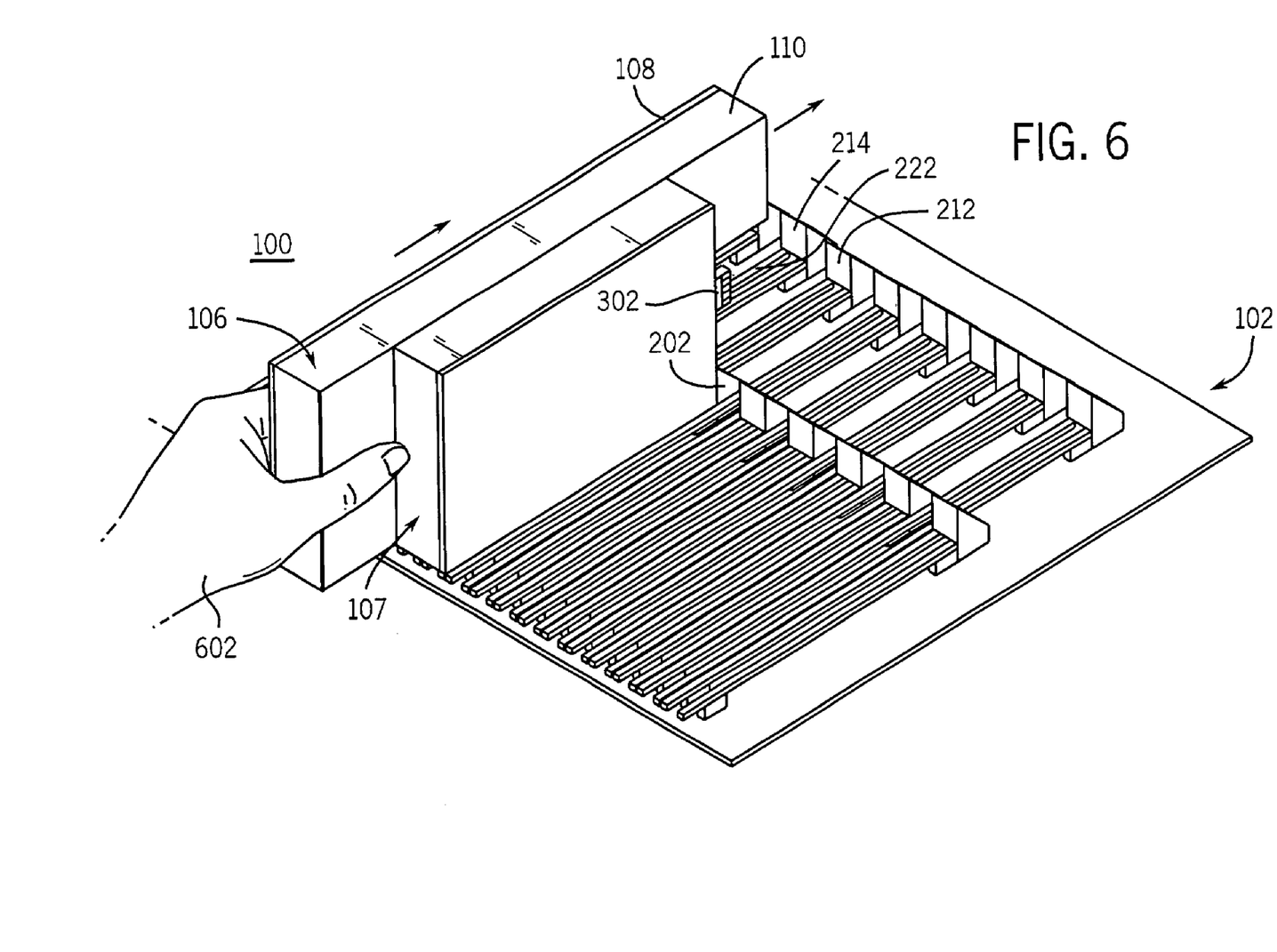
FIG. 6 is a representation of one exemplary implementation of an interaction of an user with the apparatus of FIG. 1.

Turning to FIG. 6, yet another perspective view of the apparatus 100 illustrates an exemplary implementation of an interaction of a user 602 with the long expansion circuit board 106. The user 602 may couple or decouple the long expansion circuit board 106 with the circuit board 102. The long expansion circuit board 106 comprises a first end portion and a second end portion. The first end portion comprises the connector 302. The user 602 grasps the second end portion to couple or decouple the long expansion circuit board 106 with the circuit board 102. In one example, to couple the long expansion circuit board 106 with the circuit board 102 the user 602 pushes the long expansion circuit board 106 along the card guide 222 until the connector 302 engages with the connector 214. In another example, to decouple the long expansion circuit board 106 from the circuit board 102 the user 602 pulls the long expansion circuit board 106 along the card guide 222 until the connector 302 separates from the connector 214. The long expansion circuit board 106 connects with the circuit board 102 substantially perpendicular to the circuit board 102. A plurality of long expansion circuit boards analogous to the long expansion circuit board 106 and a plurality of short expansion circuit boards analogous to the short expansion circuit board 107 may couple with the circuit board 102 in a side-by-side relationship. In yet another example, to couple the short expansion circuit board 107 with the circuit board 102 the user 602 pushes the short expansion circuit board 107 along the card guide 224 until a connector of the short expansion circuit board 107 analogous to the connector 302 engages with the connector 202.

The long expansion circuit board 106 passes through the card guide 222 to allow the connector 302 of the long expansion circuit board 106 to couple with the connector 214 of the circuit board 102. During installation of the long expansion circuit board 106, the connector 302 of the expansion circuit board 106 slides past the front row of the plurality of connectors 202, 204, 206, 208, and 210. The recess 306 of the enclosure 110 allows the connector 302 to pass the front row of the plurality of connectors 202, 204, 206, 208, and 210. Once the long expansion circuit board 106 is fully inserted into the circuit board 102, the connector 302 engages with the connector 214, providing electrical connections and mechanical support to the long expansion circuit board 106.

Figure 7:
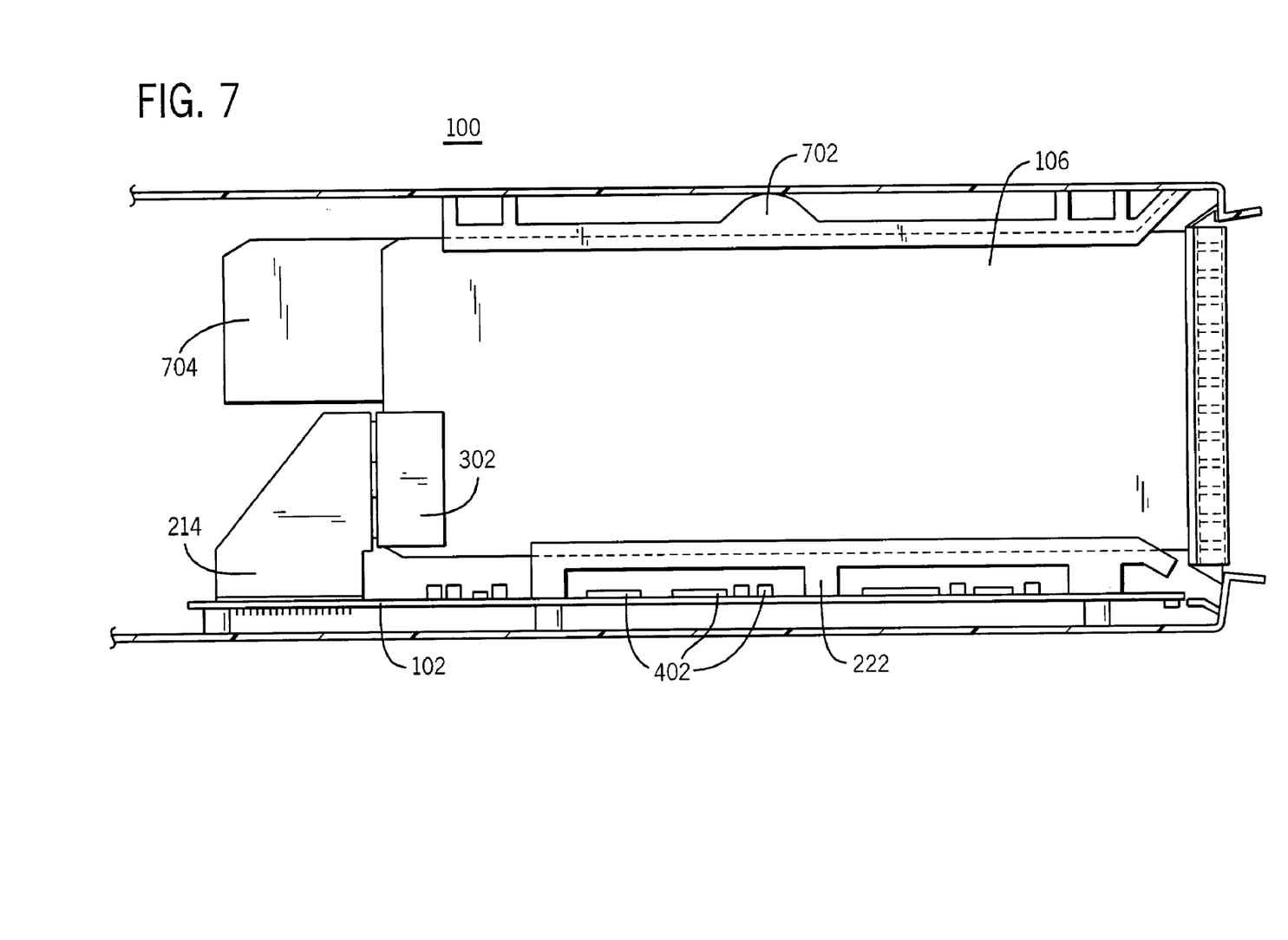
FIG. 7 represents a side view of the apparatus of FIG. 1.

Turning to FIG. 7, a side view of the perspective view of FIG. 1 illustrates an exemplary implementation of a connection of the long expansion circuit board 106 to the circuit board 102. The long expansion circuit board 106 inserts into the card guide 222 and an additional card guide 702. The additional card guide 702 comprises an optional connection component. The additional card guide 702 provides connection support to supplement connection support provided by the card guide 222. The card guide 222 and the additional card guide 702 serve to align the connector 302 of the long expansion circuit board 106 with the connector 214 of the circuit board 102 for electrical and mechanical coupling. The long expansion circuit board 106 may be further expanded such that a portion 704 of the expansion board 106 extends over and beyond the connector 302.

Figure 8:
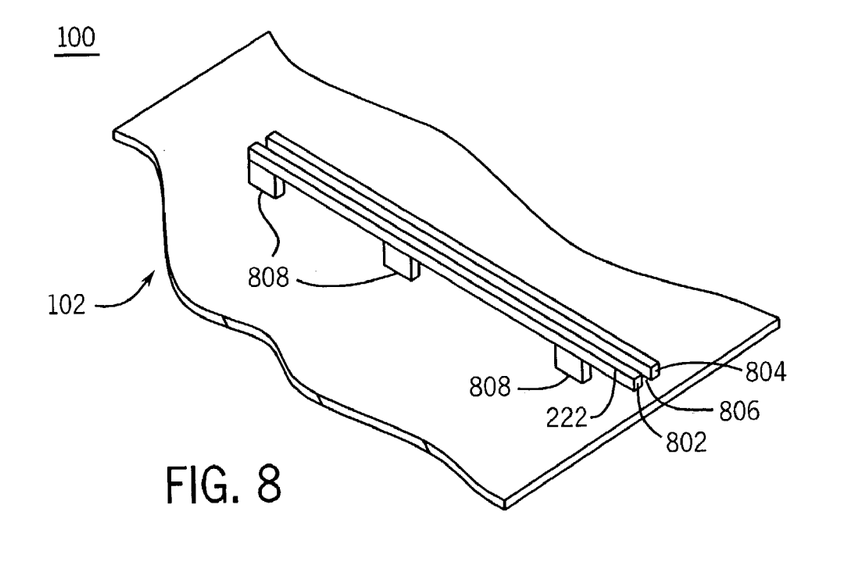
FIG. 8 is a representation of one exemplary implementation of a card guide of the apparatus in FIG. 1.

Turning to FIG. 8, yet another perspective view of the apparatus 100 illustrates an exemplary implementation of a portion of the card guide 222. The card guide 222 comprises first and second guide rails 802 and 804 comprising a side-by-side relationship and a channel 806 therebetween. The long expansion circuit board 106 slides along the channel 806 to couple the connector 302 (FIG. 3) of the long expansion circuit board 106 with the connector 214 (FIG. 2) of the circuit board 102. In one example, the card guide 222 attaches to the circuit board 102 by one or more attachment components 808. The one or more attachment components 808 comprise a dimension that corresponds to a distance of separation between the long expansion circuit board 106 and the circuit board 102. In another example, the card guide 222 comprises a channel analogous to the channel 806 on a surface of the circuit board 102. For example, the channel analogous to the channel 806 may be etched into the surface of the circuit board 102. The card guide 222 may comprise metal or plastic. The card guide 222 may accept one or either of a top edge and a bottom edge of the long expansion circuit board 106.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. An apparatus, comprising:
   a card guide that provides an installation path for an extension circuit card, wherein the installation path promotes a coupled relationship between the extension circuit card and a circuit board;
   wherein the card guide comprises a first connector and a second connector, and
   wherein the card guide is able to accommodate a long extension circuit card by receiving an edge of the long extension circuit card in the installation path to guide the long extension circuit card to a connection with the first connector; and
   wherein the card guide is able to accommodate a short extension circuit card by receiving an edge of the short extension circuit card in the installation path to guide the short extension circuit card to a connection with the second connector; and
   wherein the long extension circuit card and the short extension circuit card comprise an adjacent side-by-side relationship.

2. The apparatus claim 1, wherein the card guide comprises a first end portion and a second end portion, wherein during installation of the extension circuit card to the circuit board the extension circuit card slides in the card guide from the first end portion towards the second end portion; and
 wherein the first connector is substantially closer than the second connector to the second end portion.

3. The apparatus of claim 1, wherein if the extension circuit card comprises the long extension circuit card, then during installation of the long extension circuit card to the circuit board the long extension circuit card slides past the second connector in the card guide and attaches to the first connector.

4. The apparatus of claim 3, wherein the long extension circuit card comprises a protective enclosure that extends out from the side of the long extension circuit card, wherein the protective enclosure comprises a recess that allows clearance of a portion of the long extension circuit card to pass the second connector in the card guide and attach to the first connector.

5. The apparatus of claim 1, wherein the card guide comprises a first side portion and a second side portion; and
 wherein if the extension circuit card comprises the long extension circuit card, then the long extension circuit card attaches to the first connector on the first side portion; and
 wherein if the extension circuit card comprises the short extension circuit card, then the short extension circuit card attaches to the second connector on the second side portion.

6. The apparatus of claim 1, wherein the card guide comprises a first card guide, and wherein the installation path comprises a first installation path, and wherein the extension circuit card comprises the long extension circuit card; and
 wherein the apparatus further comprises a second card guide that provides a second installation path for the short extension circuit card, and wherein the second installation path promotes a coupled relationship between the short extension circuit card and the circuit board.

7. The apparatus of claim 6, wherein the long extension circuit card in the first card guide and short extension circuit card in the second card guide comprise the adjacent side-by-side relationship, and wherein the long and short extension circuit cards are independently connectible with the first and second card guides.

8. The apparatus of claim 1, wherein the card guide comprises a first card guide, and wherein the installation path comprises a first installation path, and wherein the extension circuit card comprises one of a plurality of long extension circuit cards; and
 wherein the apparatus further comprises a plurality of second card guides that provide. a plurality of second installation paths for any of a plurality of short extension circuit cards or the plurality of long extension circuit cards and wherein the plurality of second installation paths promote a coupled relationship between the any of the plurality of short extension circuit cards or the plurality of long extension circuit cards and the circuit board.

9. The apparatus of claim 1, wherein the first connector and the second connector comprise pedestal type connectors.

10. The apparatus of claim 1, wherein the extension circuit card, the first connector, and the second connector comprise third generation input/output industry standard components.

11. The apparatus of claim 1, wherein the first connector comprises a spaced and offset relationship along the card guide from the second connector.

12. The apparatus of claim 1, wherein either the long extension circuit board is inserted in the card guide to connect with the first connector or the short extension circuit board is inserted in the card guide to connect with the second connector.

13. The apparatus of claim 1, wherein attachment of the long extension circuit card with the first connector in the card guide prevents contemporaneous. attachment of the short extension circuit card with the second connector in the card guide.

14. The apparatus of clam 13, wherein after disconnection of the long extension circuit card from the first connector and removal of the long extension circuit card from the card guide, the short extension circuit card can be attached with the second connector in the card guide.

15. The apparatus of claim 1, wherein the long extension circuit card and the short extension circuit card are independently connectable with the card guide; and
 wherein the card guide is able to accommodate the long extension circuit card in the installation path at a first time and the short extension circuit card in the installation path at a second time.

16. The apparatus of claim 1, wherein the card guide comprises a first card guide, and wherein the apparatus further comprise a second card guide; and
 wherein the first card guide is able to accommodate either the long extension circuit card or the short extension circuit card, and wherein the second card guide is able to accommodate either the long extension circuit card or the short extension circuit card.

17. An apparatus, comprising:
 means for accommodating anyone of a plurality of different extension circuit cards in a card guide on a circuit board; and
 means for electrically and mechanically coupling the one of the plurality of different extension circuit cards to one of a plurality of connectors of the circuit board;
 wherein the plurality of different extension circuit cards comprise a long extension circuit card and a short extension circuit card; and
 wherein the card guide is able to accommodate the long extension circuit card by receiving an edge of the long extension circuit card in the card guide to guide the long extension circuit card. to a connection with a first connector of the plurality of connectors; and
 wherein the card guide is able to accommodate the short extension circuit card by receiving an edge of the short extension circuit card in the card guide to guide the short extension circuit card to a connection with a second connector of the plurality of connectors; and
 wherein the long extension circuit card and the short extension circuit card comprise an adjacent side-by-side relationship.

18. The apparatus of claim 17, wherein the means for electrically and mechanically coupling the one of the plurality of different extension circuit cards to the one of the plurality of connectors of the circuit board comprises:
 means for attaching at a first location on the card guide the long extension circuit card of the plurality of different extension circuit cards to the first connector of the circuit board; and means for attaching at a second location on the card guide the short extension circuit card of the plurality of different extension circuit cards to the second connector of the circuit board;

wherein either the long extension circuit board is inserted in the card guide to connect with the first connector or the short extension circuit board is inserted in the card guide to connect with the second connector.

19. The apparatus of claim 17, wherein the card guide comprises a first card guide, wherein the first card guide and a second card guide comprise a first location and a second location offset from the first location and wherein the means for electrically and mechanically coupling the one of the plurality of different extension circuit cards to the one of the plurality of connectors of the circuit board comprises:

means for generating the adjacent side-by-side relationship on the circuit board between the long extension circuit card of the plurality of different extension circuit cards and the short extension circuit card of the plurality of different extension circuit cards;

wherein the long extension circuit card comprises a first connector to attach to the first location of the first card guide; and wherein the short extension circuit card comprises a second connector to attach to the second location of the second card guide; and wherein the long and short extension circuit cards are independently connectible with the first and second, card guides.

20. A method, comprising the steps of:

accommodating any one of a plurality of different extension circuit cards in a card guide on a circuit board; and coupling electrically and mechanically the one of the plurality of different extension circuit cards to one of a plurality of connectors of the circuit board;

wherein the plurality of different extension circuit cards comprise a long extension circuit card and a short extension circuit card; and wherein the card guide is able to accommodate the long extension circuit card by receiving an edge of the long extension circuit card in the card guide to guide the long extension circuit card to a connection with a first connector of the plurality of connectors; and wherein the card guide is able to accommodate the short extension circuit card by receiving an edge of the short extension circuit card in the card guide to guide the short extension circuit card to a connection with a second connector of the plurality of connectors; and wherein the long extension circuit card and the short extension circuit card comprise an adjacent side-by-side relationship.

21. The method of claim 20, wherein the step of coupling electrically and mechanically the one of the plurality of different extension circuit cards to the one of the plurality of connectors of the circuit board comprises the steps of:

attaching at a first location on the card guide the long extension circuit card of the plurality of different extension circuit cards to the first connector of the circuit board if the one of the plurality of different extension circuit cards comprises the long extension circuit card; and attaching at a second location on the card guide the short extension circuit card of the plurality of different extension circuit cards to the first connector of the circuit board if the one of the plurality of different extension circuit cards comprises the abort extension circuit card;

wherein either the long extension circuit board is inserted in the card guide to connect with the first connector or the short extension circuit board is inserted in the card guide to connect with the second connector.

22. The method of claim 20, further comprising the step of:

generating the adjacent side-by-side relationship on the circuit board between the long extension circuit card of the plurality of different extension circuit cards and the short extension circuit card of the plurality of different extension circuit cards;

wherein the long extension circuit card comprises a first connector to attach to the first location of the first card guide; and wherein the short extension circuit card comprises a second connector to attach to the second location of the second card guide; and wherein the long and short extension circuit cards are independently connectible with the first and second card guides.

* * * * *

UNITED STATES PATENT AND TRADEMARK OFFICE
CERTIFICATE OF CORRECTION

PATENT NO. : 7,187,555 B2
APPLICATION NO. : 10/458008
DATED : March 6, 2007
INVENTOR(S) : Robert G. Campbell et al.

It is certified that error appears in the above-identified patent and that said Letters Patent is hereby corrected as shown below:

On the title page, item (54), in "Title", in column 1, lines 1-2,
delete "CARD GUIDE FOR EXPANSION CIRCUIT CARD" and
insert -- EXTENSION CIRCUIT CARD --, therefor.

In column 1, lines 1-2, delete "CARD GUIDE FOR EXPANSION CIRCUIT CARD" and insert -- EXTENSION CIRCUIT CARD --, therefor.

In column 6, line 51, in Claim 1, delete "connector," and insert -- connector; --, therefor.

In column 6, line 65, in Claim 2, after "apparatus" insert -- of --.

In column 6, line 66, in Claim 2, before "wherein" insert -- and --.

In column 7, line 53, in Claim 8, delete "provide." and insert -- provide --, therefor.

In column 7, line 56, in Claim 8, delete "cards" and insert -- cards, --, therefor.

In column 7, line 64, in Claim 10, delete "extension" and insert -- expansion --, therefor.

In column 8, line 11, in Claim 13, delete "contemporaneous." and insert -- contemporaneous --, therefor.

In column 8, line 29, in Claim 16, delete "comprise" and insert -- comprises --, therefor.

In column 8, line 49, in Claim 17, delete "card." and insert -- card --, therefor.

UNITED STATES PATENT AND TRADEMARK OFFICE
CERTIFICATE OF CORRECTION

PATENT NO. : 7,187,555 B2
APPLICATION NO. : 10/458008
DATED : March 6, 2007
INVENTOR(S) : Robert G. Campbell et al.

It is certified that error appears in the above-identified patent and that said Letters Patent is hereby corrected as shown below:

In column 9, line 12, in Claim 19, delete "first location" and insert -- first location, --, therefor.

In column 9, line 28, in Claim 19, delete "second," and insert -- second --, therefor.

In column 10, line 22, in Claim 21, delete "abort" and insert -- short --, therefor.

In column 10, line 27, in Claim 22, delete "claim 20." and insert -- claim 20, --, therefor.

Signed and Sealed this

Twenty-second Day of December, 2009

David J. Kappos
*Director of the United States Patent and Trademark Office*